W. T. BARNES.
Oil Still.
No. 24,921.
Patented Aug. 2, 1859.
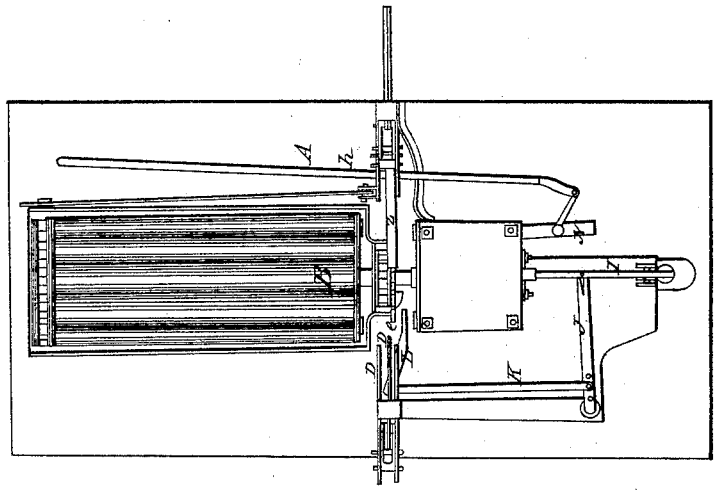
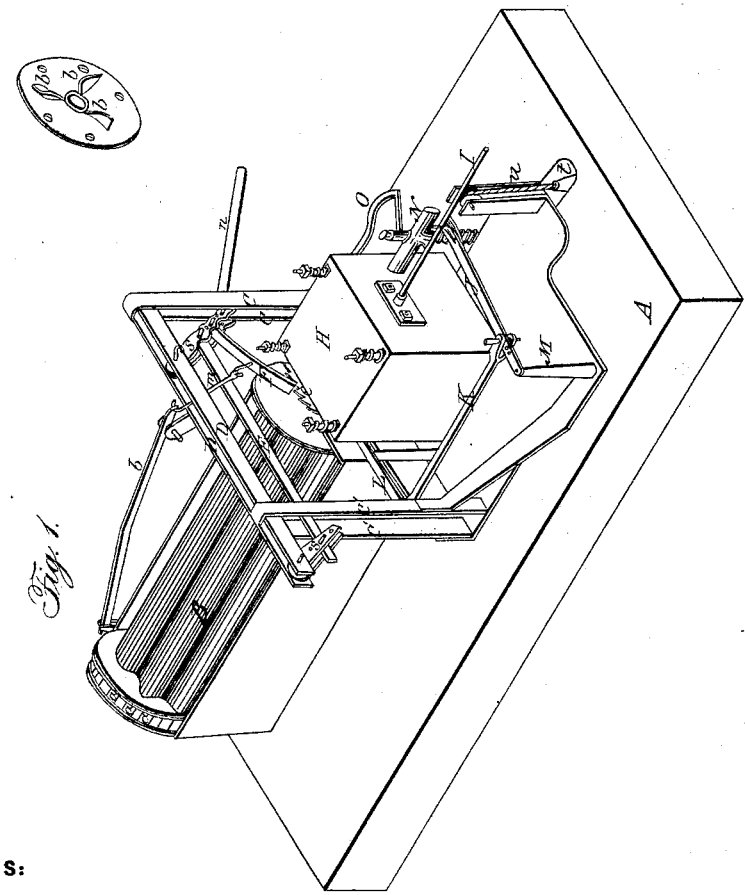
Witnesses:
C. M. Alexander,
J. H. Alexander
Inventor:
William T. Barnes

UNITED STATES PATENT OFFICE.

WILLIAM T. BARNES, OF BUFFALO, NEW YORK.

IMPROVEMENT IN APPARATUS FOR GENERATING COAL-OIL.

Specification forming part of Letters Patent No. 24,921, dated August 2, 1859.

*To all whom it may concern:*

Be it known that I, WILLIAM T. BARNES, of Buffalo, in the county of Erie and State of New York, have invented certain new and useful Improvements in Machines for Manufacturing Coal-Oil; and I do hereby declare that the following is a full, clear, and exact description thereof, reference being had to the accompanying drawings, and to the letters of reference marked thereon.

The nature of my invention consists in the employment and arrangement of those parts which will be hereinafter particularly described.

In the annexed drawings, Figure 1 is a perspective view of my machine. Fig. 2 represents a plan view.

A represents in the drawings the base, on which the machine stands.

B represents a retort, which is secured in an ordinary stock in such a manner as that it may be allowed to revolve. Friction-rollers *a a a* may be secured between rims which surround the ends of this retort, or friction-rollers may be differently arranged and used in order to reduce the friction consequent upon the revolving of a heavy body in journal-bearings.

The retort B is made in a corrugated form. The object of making the retort corrugated is that more heating-surface may be presented to the material within. The corrugations extend up into the material, and not only heat a greater quantity of it than can be done in a cylindrical retort, but they also prevent the material from sliding around, and serve to turn it over and over. I am aware that ribs have been used in a retort to prevent the material from sliding around; but they have a tendency to diminish rather than increase the amount of heat given out to the material. They consequently serve only one object, while they are partially detrimental in other respects. On the axle, at the front of the retort, is secured a ratchet-wheel, *e*, the use of which will be described hereinafter. In front of the retort are placed the uprights C C, and to the top of these uprights are secured the cross-bars D D.

At or near the ends of the bars D D, and between them, are pivoted swinging frames *s s*. Said frames are pivoted to the bars at their top, and are provided with a series of holes, as seen.

E represents a bar, which connects the two frames *s s*. A pin passes through said connecting-bar and through the holes in the frames, and by means of these holes and the pins the bar may be easily adjusted, so as to have a long or a short vibration, as the case may require. To one of the frames is attached a ratchet, F, which works in the teeth on the ratchet-wheel *e*, and when the frame vibrates an intermitting revolving motion is communicated to the retort.

H represents the dust-box, which is connected to the retort by means of the hollow journal, on which the retort revolves.

I represents a rod, which is provided at one end with a scraper. This rod passes through the dust-box and into the hollow journal, and is for the purpose of keeping said journal free from dust.

L represents a lever, which is operated upon at one end by a cam secured on the side of the ratchet-wheel *e*.

K and J are levers, which connect the lever L with the rod I.

*u* is a cord, one end of which is secured to the rod I and the other end to a weight, *t*.

When the ratchet-wheel revolves, the cam on it operates upon lever L, and motion is thus given to levers K and J and to rod I. The rod is forced into the hollow of the journal and drives the dust inward. When the cam has ceased to act upon the rod, the cord and weight serve to draw it back instantly to its proper position and to a state of rest, where it remains until the retort makes another revolution and brings around the cam, when it is again moved forward, and is then drawn back again, as before. It will be perceived that I thus form an automatic clearer, which performs its work regularly and surely. A packed joint is made around the rod where it passes into the dust-box, and the parts are so fitted as to prevent the gas from escaping as it passes through the box.

*h* is a lever, which is connected by means of the rod *m* to the ratchet F, for the purpose of raising said ratchet from the teeth of wheel *e* when it is desired to have the retort stand still.

*z*, Fig. 2, represents a pawl, which prevents the ratchet-wheel from turning back as it is being moved forward by ratchet F.

*b b b* represent flanges, which are secured in screw form on that head of the retort through which the hollow journal passes. These flanges extend up to the hole through which the gas passes, and as the retort revolves the flanges throw or wind the material away from the hole in the journal. By means of these flanges I am enabled to put a larger charge into the retort than I could do otherwise.

It will readily be seen that by means of the arrangement herein described for revolving the retort any number of retorts may be connected and operated together. The motion of the retort is regulated by means of the bar E and the frames s s. By lowering the bar E a long vibration and a faster motion will be given; but when the said bar is elevated, so that the vibration will be short, the motion will be slow.

N represents a pipe, which conducts the gas away from the dust-box. This pipe is provided with a stop-cock, which has a lever, o, attached to its handle, for the purpose of opening or closing the pipe at pleasure. By employing a pipe for each retort the flow of gas may be at any time cut off when it is desired to open and clean out any particular retort.

Having thus fully described my invention, what I claim as new, and desire to secure by Letters Patent, is—

1. The arrangement of the levers L, K, and J, and rod I, whether operated by a cam or otherwise, for the purpose of forming an automatic dust-clearer to coal-oil retorts, as is herein substantially set forth.

2. The employment of the spiral or screw flanges on the head of the retort for pushing the material away from the hole in the journal, as is herein fully described.

WILLIAM T. BARNES.

Witnesses:
C. M. ALEXANDER,
T. H. ALEXANDER.